(12) United States Patent
Forbes, Jr.

(10) Patent No.: US 7,621,551 B1
(45) Date of Patent: Nov. 24, 2009

(54) TRAILER HITCH ADAPTOR ASSEMBLY

(75) Inventor: Allen R. Forbes, Jr., Kingston, OK (US)

(73) Assignee: The Allen R. Forbes, Jr. and Stacey L. Forbes Revocable Living Trust, Kingston, OK (US)

( * ) Notice: Subject to any disclaimer, the term of this patent is extended or adjusted under 35 U.S.C. 154(b) by 143 days.

(21) Appl. No.: 11/591,089

(22) Filed: Oct. 31, 2006

Related U.S. Application Data

(60) Provisional application No. 60/732,436, filed on Oct. 31, 2005.

(51) Int. Cl.
*B62D 53/06* (2006.01)
(52) U.S. Cl. .............. 280/441.2; 280/480; 280/432; 280/457; 280/417.1
(58) Field of Classification Search .............. 280/441.2, 280/425.2, 423.1, 901, 417.1, 480, 432, 457, 280/511
See application file for complete search history.

(56) References Cited

U.S. PATENT DOCUMENTS

| | | | | |
|---|---|---|---|---|
| 2,937,885 A | * | 5/1960 | Skow | 280/457 |
| 3,125,355 A | * | 3/1964 | Snuggins | 280/457 |
| 3,132,878 A | * | 5/1964 | De Puydt et al. | 280/457 |
| 3,827,722 A | * | 8/1974 | Miller et al. | 280/432 |
| 4,251,089 A | * | 2/1981 | Skaggs | 280/433 |
| 5,435,585 A | * | 7/1995 | Chambers | 280/415.1 |
| 5,797,614 A | * | 8/1998 | Hord et al. | 280/417.1 |
| 5,803,518 A | * | 9/1998 | Gibbons | 294/18 |
| 5,893,575 A | * | 4/1999 | Larkin | 280/491.1 |
| 5,918,896 A | * | 7/1999 | Jenkins, Jr. | 280/457 |
| 6,179,317 B1 | * | 1/2001 | Hurst et al. | 280/457 |
| 6,883,820 B2 | * | 4/2005 | Freeman | 280/441.2 |
| 6,935,664 B2 | * | 8/2005 | McGrew et al. | 294/26 |

\* cited by examiner

*Primary Examiner*—Lesley D. Morris
*Assistant Examiner*—Tashiana Adams
(74) *Attorney, Agent, or Firm*—Crowe & Dunlevy

(57) ABSTRACT

An adaptor assembly for attaching a gooseneck assembly to a hitch plate preferably includes a hitch connection tool having a body with a first end and a second end; an adaptor plate connectable to the hitch plate, the adaptor plate having a knob; a safety chain adaptor connectable to the knob; and an attachment device to attach the adaptor plate to the hitch plate. In a preferred embodiment, the second end of the body of the hitch connection tool includes a hook, and the hitch connection tool includes an arm attached between the first end and the second end of the body.

18 Claims, 5 Drawing Sheets

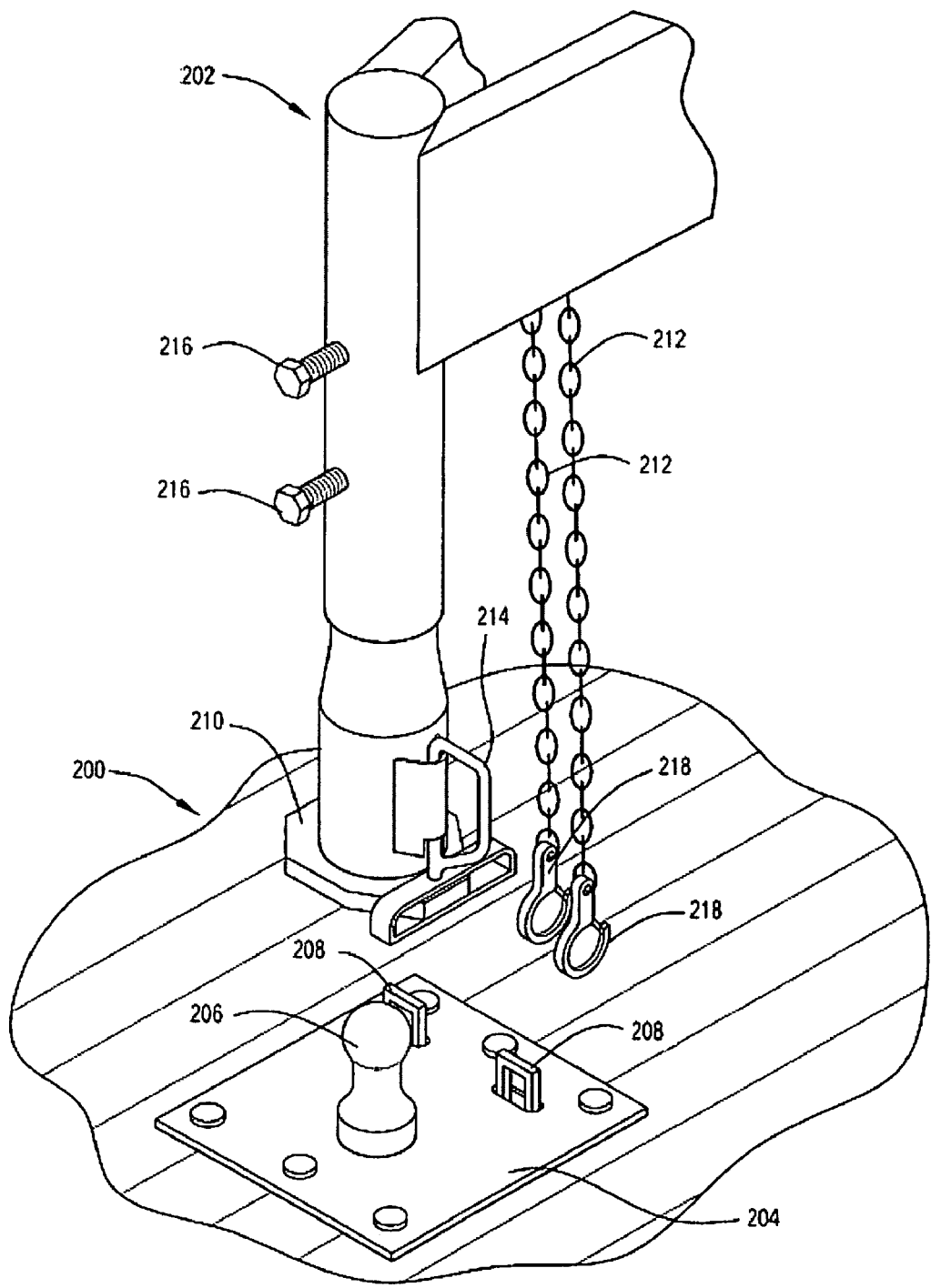
PRIOR ART

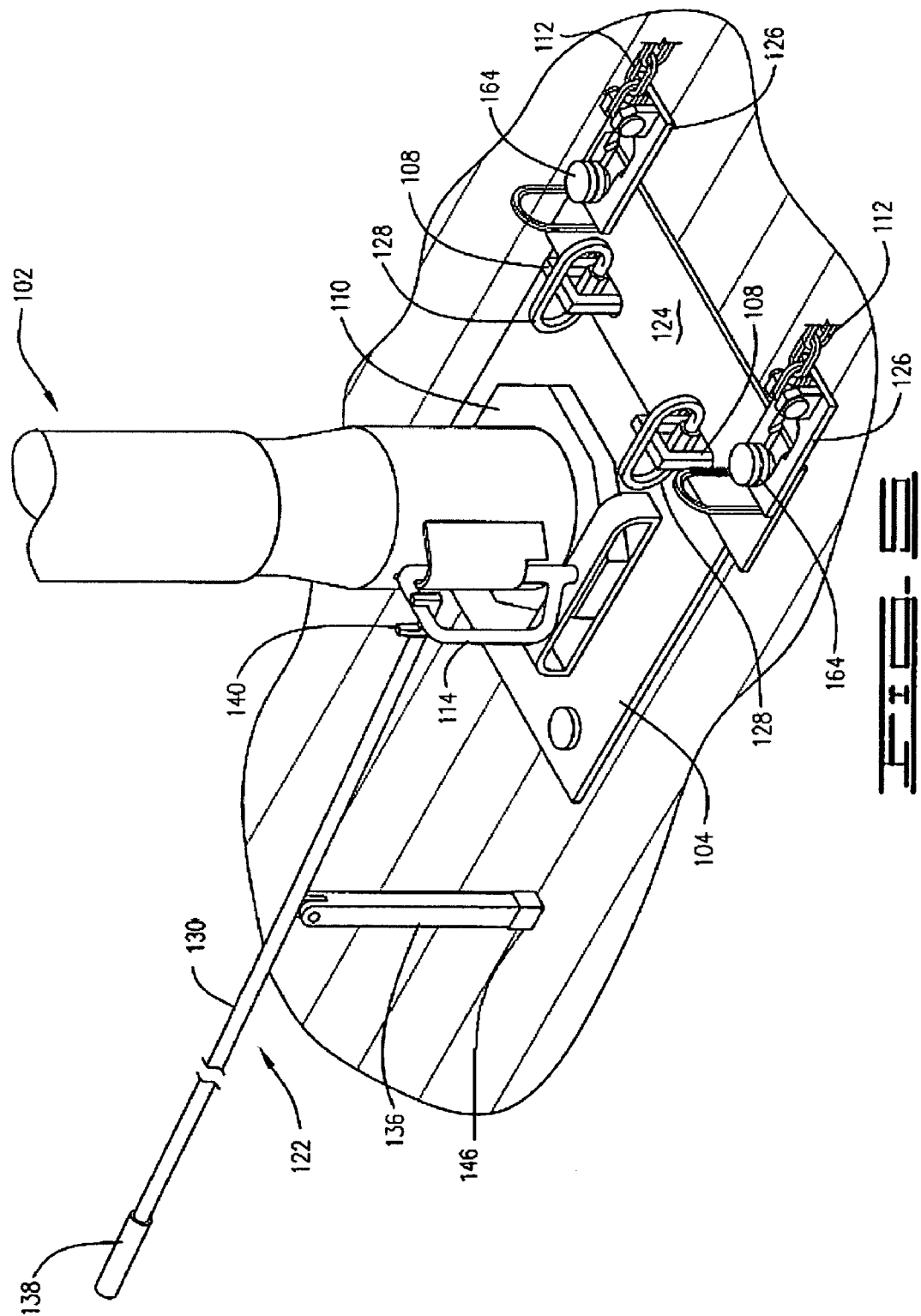

US 7,621,551 B1

TRAILER HITCH ADAPTOR ASSEMBLY

RELATED APPLICATIONS

This application claims the benefit of U.S. Provisional Patent Application No. 60/732,436, filed Oct. 31, 2005, entitled Trailer Hitch Assembly and Method, the disclosure of which is incorporated herein.

FIELD OF THE INVENTION

This invention relates generally to trailer hitches, and more specifically to an improved gooseneck trailer hitch and method of attaching a gooseneck trailer hitch.

BACKGROUND OF THE INVENTION

Hitching and unhitching a gooseneck trailer to a truck requires considerable stretching and climbing on the part of the user. Once the trailer is lined up with the ball of the hitch, the user must generally climb into the bed of the truck to attach the socket end of the gooseneck to the ball, and then attach the safety chains to the hitch plate. The climbing, leaning, and kneeling required to hitch and unhitch a gooseneck trailer may be difficult for people with back or knee injuries, or for those who are advanced in age. Accordingly, there is a need for a trailer hitch adaptor assembly that allows the user to quickly hitch and unhitch a gooseneck trailer without climbing into the bed of a truck.

SUMMARY OF THE INVENTION

In a preferred embodiment, the present invention includes an adaptor assembly that facilitates the hitching and unhitching of a gooseneck trailer. The adaptor assembly includes a hitch connection tool, an adaptor plate to fit over the hitch plate of an existing hitch, attachment devices to attach the adaptor plate to the hitch plate, and safety chain adaptors. The hitch connection tool preferably includes a hook at one end and an arm. Numerous other objects, features and advantages of the invention will be apparent to those skilled in the art upon reading the following description of preferred embodiments.

BRIEF DESCRIPTION OF THE DRAWINGS

FIG. 1 is a perspective view of a prior art gooseneck trailer hitch assembly.

FIG. 5 is a perspective view of the gooseneck assembly, hitch plate, and adaptor assembly constructed in accordance with the present invention.

DETAILED DESCRIPTION OF THE PREFERRED EMBODIMENT

Figure 2:
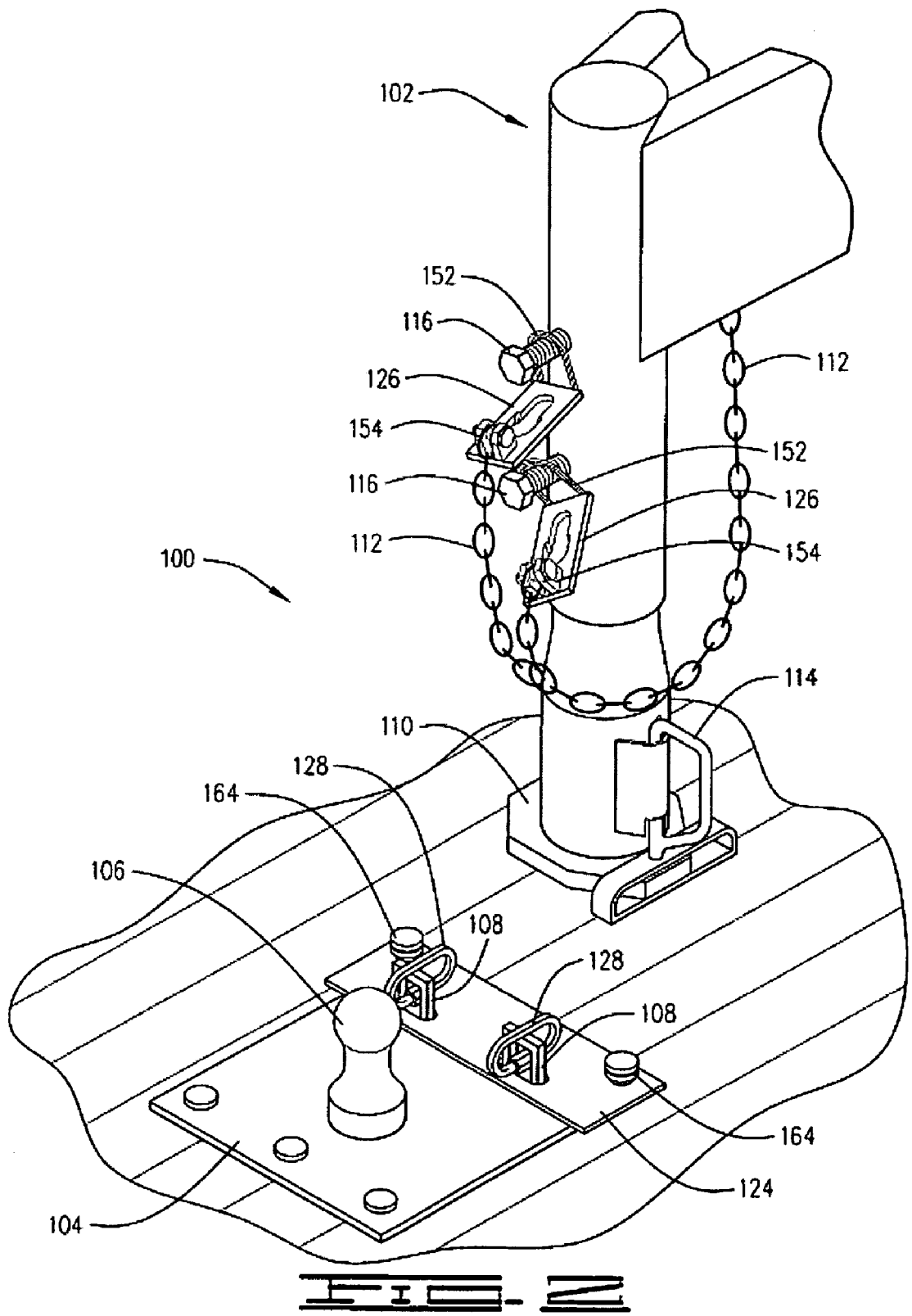
FIG. 2 is a perspective view of the gooseneck assembly, hitch plate, and parts of the adaptor assembly constructed in accordance with the present invention.

Prior art hitch assemblies 200 for gooseneck trailers generally include a hitch plate 204 and a gooseneck assembly 202. Referring to the prior art hitch assembly 200 shown in FIG. 1, the hitch plate 204, which is attached to the bed of a truck, includes a ball 206 and two safety chain brackets 208. The gooseneck assembly 202 is part of a trailer and includes a socket 210 to receive the ball 206, two safety chains 212, a latch 214, and adjusting bolts 216. The safety chains 212 include hooks 218 that fasten to the safety chain brackets 208. When connected to the safety chain brackets 208, the safety chains 212 act as back-up safety devices in case the ball 206 and socket 210 connection fails during travel.

Turning to FIG. 2, a new hitch assembly 100 includes a gooseneck assembly 102, a hitch plate 104, and an adaptor assembly 120 (not labeled in FIG. 2). The hitch plate 104, which is attached to the bed of a truck, includes a ball 106 and two safety chain brackets 108. The gooseneck assembly 102 is part of a trailer and includes a socket 110 to receive the ball 106, two safety chains 112, a latch 114, and adjusting bolts 116. The adaptor assembly 120 includes a hitch connection tool 122 (not shown in FIG. 2), an adaptor plate 124, attachment devices 128 for attaching the adaptor plate to the hitch plate 104, and safety chain adaptors 126.

In an alternative embodiment, the hitch plate 104 includes knobs in place of safety chain brackets 108. The adaptor assembly of the alternative embodiment includes the hitch connection tool 122 and safety chain adaptors 126.

Figure 3:
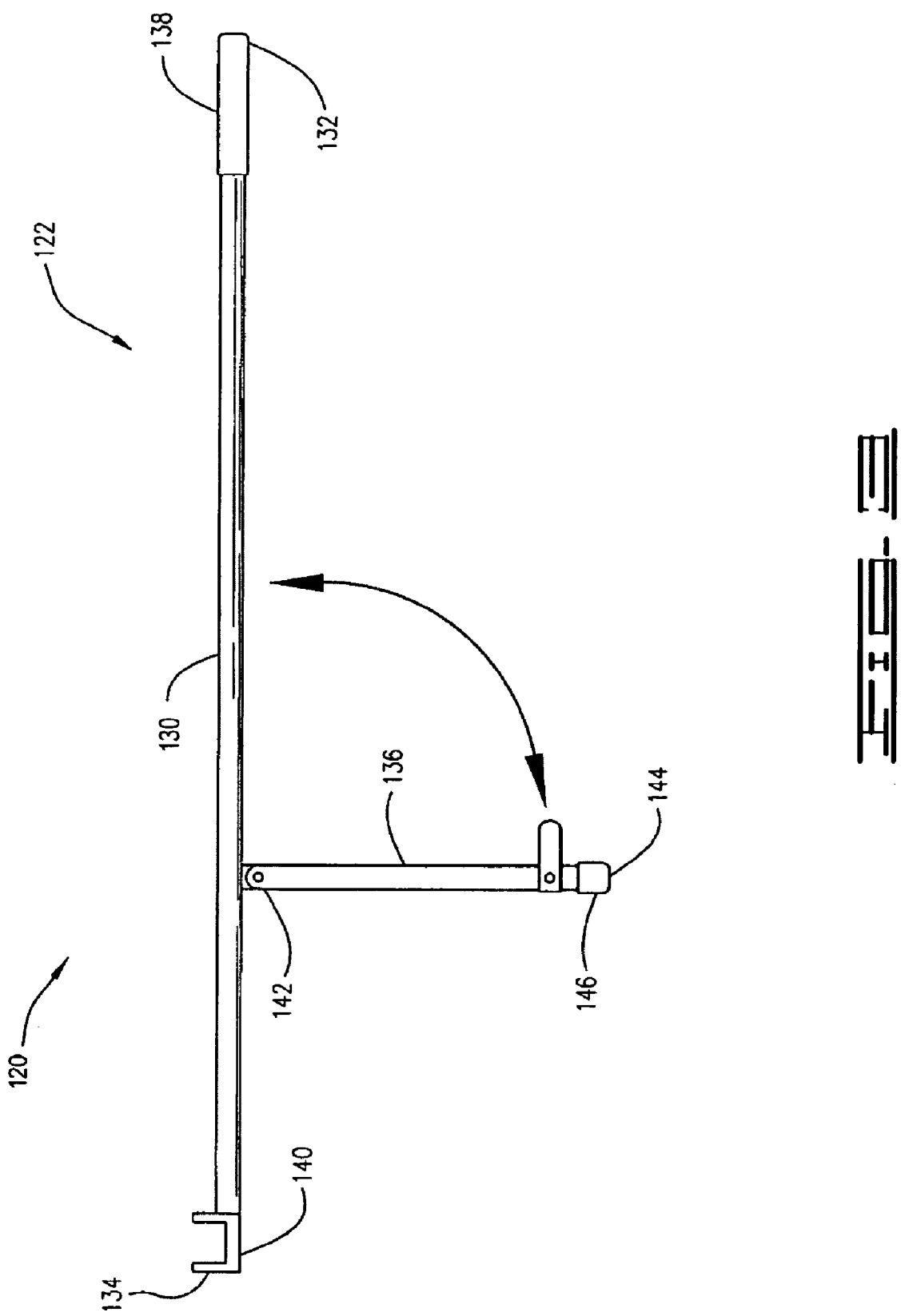
FIG. 3 is a side elevational view of a hitch connection tool constructed in accordance with the present invention.

Turning to FIG. 3, depicted therein is the hitch connection tool 122, which is a part of adaptor assembly 120. The hitch connection tool 122 comprises a body 130 and an arm 136. The body 130 includes a first end 132 with a grip 138, and a second end 134 with a hook 140. In an alternative embodiment, hook 140 can be replaced with other gripping devices, such as alligator clips or prongs. Arm 136 includes a first end 142, which attaches between the first end 132 and second end 134 of the hitch connection tool 122, and a second end 144 with a grip 146. Preferably, the grips 138 and 146 on the body 130 and the arm 136 are made of rubber. The arm 136 preferably is connected to the body 130 in a manner that allows it to pivot away from the body 130 of the hitch connection tool 122 or lie flat against the body 130.

Figure 4:
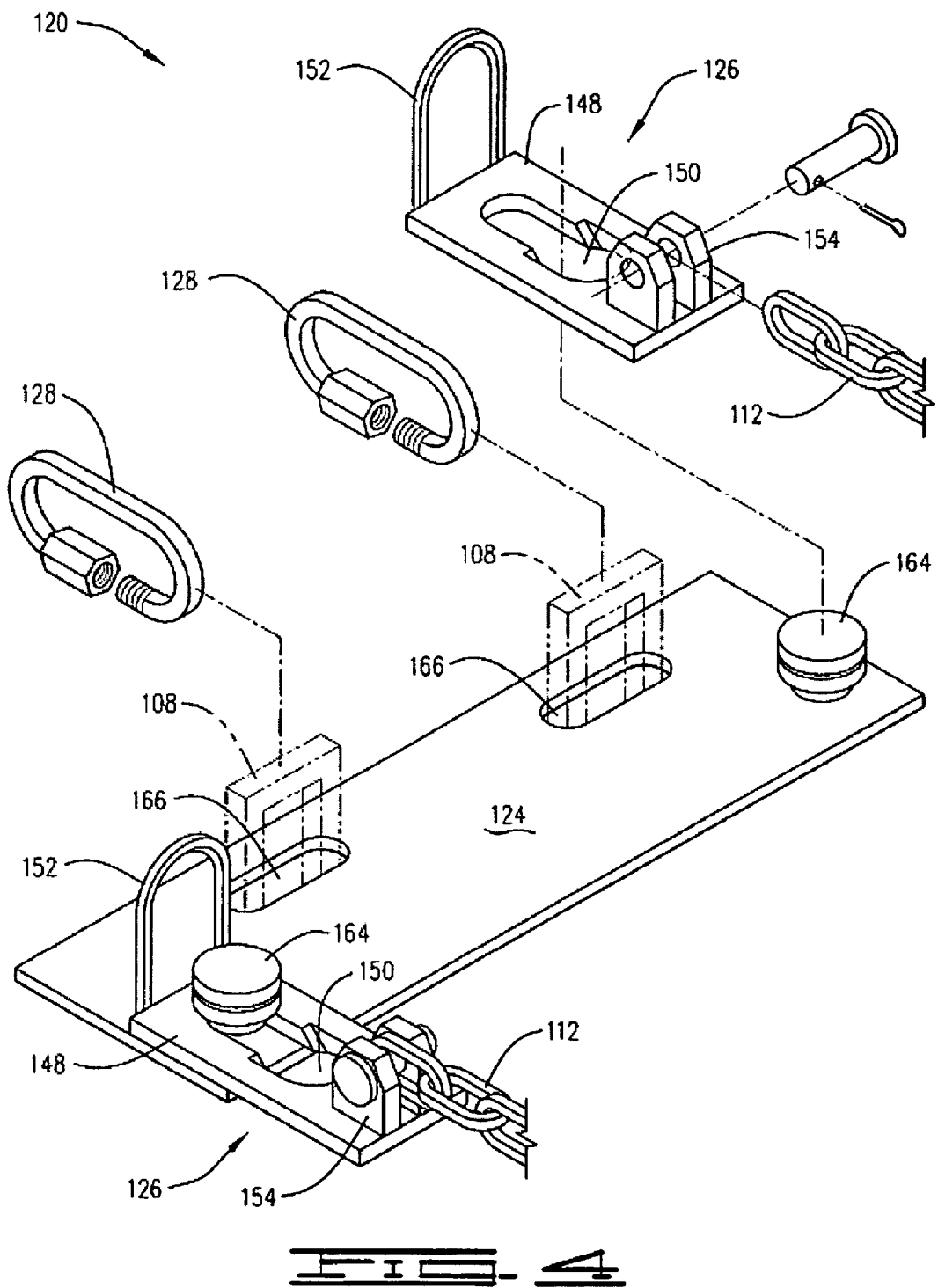
FIG. 4 is a perspective view of the adaptor plate, attachment devices, and safety chain adaptors constructed in accordance with the present invention.

Turning to FIG. 4, depicted therein are parts of adaptor assembly 120. The adaptor plate 124 includes two knobs 164 and two openings 166 through which the safety chain brackets 108 may be placed. In a preferred embodiment, adaptor plate 124 is secured to hitch plate 104 by placing the brackets 108 through openings 166 of adaptor plate 124, and then placing the attachment devices 128 through the safety chain brackets 108. In a particularly preferred embodiment, the attachment devices 128 are quick links, as shown in FIG. 4. In alternative embodiments, the attachment devices 128 could be clips or hooks. It is also contemplated that the adaptor plate 124 could be permanently attached to the hitch plate 104 by solder, glue, or epoxy. The adaptor plate 124 may be made of steel or other suitable material.

Safety chain adaptor 126 includes a plate 148 with an opening 150, a handle 152 designed to be manipulated by the hook 140 of the hitch connection tool 122, and a chain attachment mechanism 154. The safety chain adaptor 126 is connected to the adaptor plate 124 by placing opening 150 over knob 164. In a preferred embodiment, the opening 150 is a slot having the shape of a keyhole, with one end wider than the other. The knob 164 preferably has a neck and a head, with the head having a diameter to fit in the wide end of opening 150, and the neck having a diameter to fit in the narrow end of slot 150. In the preferred embodiment, the safety chain adaptor 126 is attached by placing the wide end of opening 150 over knob 164, and then sliding the adaptor so that the narrow end of opening 150 is in contact with the neck of knob 164, as shown in FIG. 4.

Turning to FIG. 5, in a preferred method of installing the adaptor assembly 120, the adaptor plate 124 is first fitted over the safety chain brackets 108 of hitch plate 104. The adaptor plate 124 is secured to the hitch plate 104 by connecting an attachment device 128 to each safety chain bracket 108. Next, if safety chains 112 do not have safety chain adaptors 126 attached, then any existing hooks on safety chains 112 are removed and replaced with safety chain adaptors 126. In a preferred embodiment, a link of the safety chain 112 is placed in the chain attachment mechanism 154 and secured by placing a pin 160 through the chain attachment mechanism 154 and the link. The pin 160 is then secured by a cotter pin 162. It will be understood that alternative methods of connecting safety chain adaptors 126 to the safety chains 112, such as soldering or using clips, are also contemplated by this invention.

After the adaptor assembly 120 has been installed, it may then be used to easily hitch and unhitch the gooseneck trailer. Prior art gooseneck hitches, such as the hitch assembly shown in FIG. 1, require a user to climb into the back of a truck to hitch and unhitch the trailer. A benefit made possible by the adaptor assembly 120 is that the user can easily hitch and unhitch the trailer while standing at the side of the truck. No climbing or bending is required once the new adaptor assembly 120 has been installed.

A new method for hitching a gooseneck trailer uses the adaptor assembly 120 described above. First, the chain adaptors 126 are temporarily hung on the adjusting bolts 116 of the gooseneck assembly 102. The truck is then backed up to align the ball 106 with the gooseneck socket 110, and the gooseneck socket 110 is lowered onto the ball 106 of the hitch plate 104. The gooseneck assembly 102 is latched to the ball 106 on the truck by catching the latch 114 with the hook 140 of the hitch connection tool 122, rotating the latch 114, and letting it down. It will be understood that different hitches may use different latching mechanisms, but the hitch connection tool 122 of the present invention may be used with a variety of hitch mechanisms.

To secure the safety chains 112, the handle 152 of chain adaptor 126 is caught with the hook 140 of the hitch connection tool 122, and the opening 150 of the chain adaptor 126 is placed over a knob 164 on the adaptor plate 124. The chain adaptor 126 is then pushed forward with the hitch connection tool 122 so that the chain adaptor 126 is secured into place, with the narrow portion of the opening 150 around the knob 164. The second chain adaptor 126 is then secured to the second knob 164.

In order to unhitch the trailer, the hitch connection tool 122 and hook 140 are used to unlatch the gooseneck assembly 102 from the ball 106. The arm 136 is pivoted away from the hitch connection tool 122 so that it extends at an angle from the tool 122. The grip 146 of the arm 136 is set in the bed of the truck, while the hook 140 of the hitch connection tool 122 is inserted into the latch 114 of the gooseneck assembly 102. Using the arm 136 as leverage, the latch 114 is pulled up, rotated, and secured in a raised position. Either before or after the latch is raised, the chain adaptors 126 are unhooked from the knobs 164 on the adaptor plate 124, and then hung on the adjusting bolts 116 of the gooseneck assembly 102. Now the gooseneck assembly 102 may be raised above the truck.

It will be understood that this adaptor assembly and method may also be useful for other hitch types, such as hitches on semi-trailers. Furthermore, the steps of hitching or unhitching a trailer may be performed in a different order from that described above.

It is clear that the present invention is well adapted to carry out its objectives and attain the ends and advantages mentioned above as well as those inherent therein. While the presently preferred embodiment of the invention has been described for purposes of disclosure, it will be understood that numerous changes may be made which will readily suggest themselves to those skilled in the art and which are encompassed within the spirit of the invention disclosed herein and in the associated drawings.

The invention claimed is:

1. An adaptor assembly for attaching a gooseneck assembly to a hitch plate of the type comprising a ball and a safety chain bracket, the adaptor assembly comprising:
   a hitch connection tool having a body with a first end and a second end;
   an adaptor plate connectable to the hitch plate, the adaptor plate comprising a knob and an opening for receiving the safety chain bracket;
   a safety chain adaptor connectable to the knob using the hitch connection tool; and
   an attachment device to attach the adaptor plate to the hitch plate.

2. The adaptor assembly of claim 1, wherein the second end of the body of the hitch connection tool comprises a hook directly connected to the second end.

3. The adaptor assembly of claim 2, wherein the hitch connection tool comprises an arm attached to the body between the first end and the second end.

4. The adaptor assembly of claim 1, wherein the arm is pivotally attached to the body between the first end and the second end.

5. The adaptor assembly of claim 4, wherein the first end of the body of the hitch connection tool comprises a grip.

6. The adaptor assembly of claim 1, wherein the safety chain adaptor comprises a plate containing an opening.

7. The adaptor assembly of claim 1, wherein the opening is keyhole-shaped.

8. The adaptor assembly of claim 1, wherein the safety chain adaptor comprises a handle.

9. The adaptor assembly of claim 1, wherein the safety chain adaptor comprises a chain attachment mechanism.

10. The adaptor assembly of claim 1, wherein the attachment device is a quick link.

11. The adaptor assembly of claim 1, wherein the adaptor plate further comprises oblong openings for receiving the safety chain brackets.

12. An adaptor assembly for attaching a gooseneck assembly to a hitch plate of the type comprising a ball and a safety chain bracket, comprising:
   a hitch connection tool having a body with a first end and a second end, wherein the second end comprises a hook;
   an adaptor plate connectable to the hitch plate, the adaptor plate comprising a knob and an opening for receiving the safety chain bracket, the knob comprising a head and a neck with a diameter smaller than the diameter of the head;
   a safety chain adaptor removably connectable to the knob using the hitch connection tool; and
   a quick link to attach the adaptor plate to the hitch plate.

13. The adaptor assembly of claim 12, wherein the hitch connection tool comprises an arm attached to the body between the first end and the second end.

14. The adaptor assembly of claim 13, wherein the arm is pivotally attached to the body between the first end and the second end.

15. The adaptor assembly of claim 13, wherein the hitch connection tool comprises a grip at the first end of the body.

16. The adaptor assembly of claim 12, wherein the safety chain adaptor comprises a plate with a keyhole-shaped opening.

17. The adaptor assembly of claim 12, wherein the safety chain adaptor comprises a handle.

18. The adaptor assembly of claim 12, wherein the safety chain adaptor comprises a chain attachment mechanism, and wherein the chain attachment mechanism comprises an opening for a pin.

* * * * *